H. R. HUGHES.
ROTARY BORING DRILL.
APPLICATION FILED AUG. 6, 1917.
1,257,353.
Patented Feb. 26, 1918.
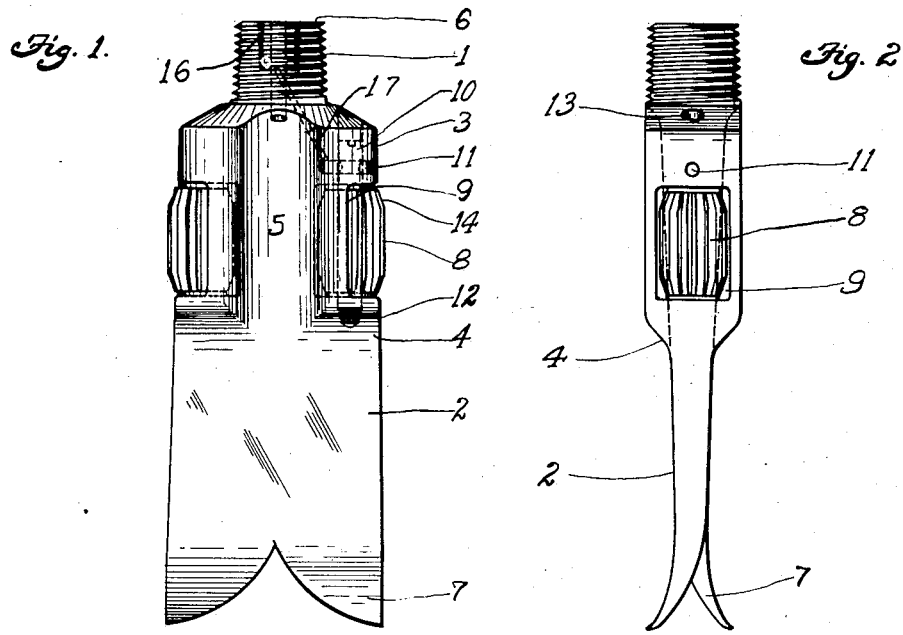
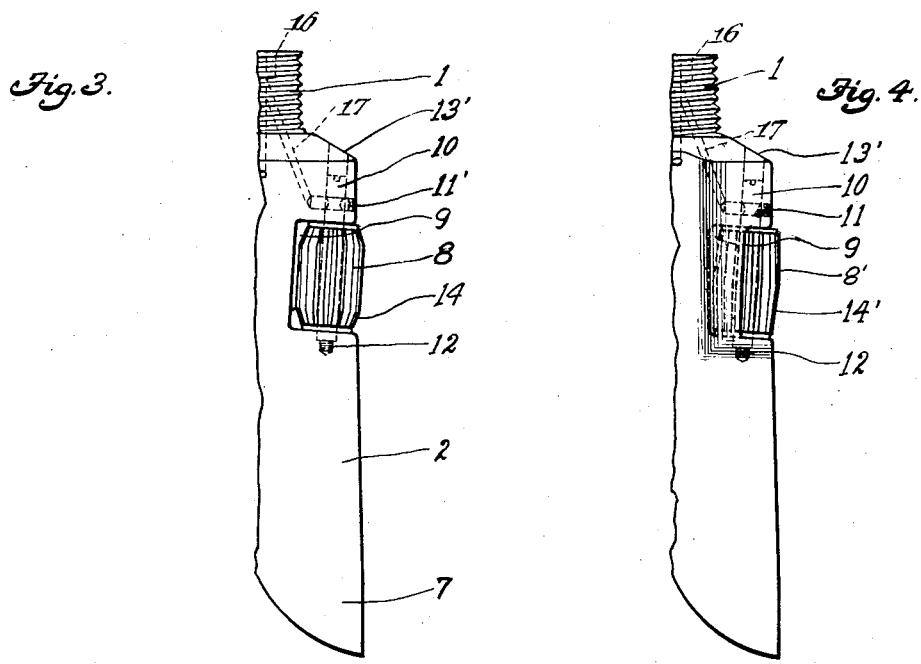
Howard R. Hughes, Inventor
By his Attorney Jesse R. Stone

UNITED STATES PATENT OFFICE.

HOWARD R. HUGHES, OF HOUSTON, TEXAS.

ROTARY BORING-DRILL.

1,257,353.  Specification of Letters Patent.  Patented Feb. 26, 1918.

Application filed August 6, 1917. Serial No. 184,606.

*To all whom it may concern:*

Be it known that I, HOWARD R. HUGHES, a citizen of the United States, residing at Houston, Harris county, Texas, have invented a certain new and useful Improvement in Rotary Boring-Drills, of which the following is a full, clear, and exact description, such as will enable others skilled in the art to which it appertains to make and use the same.

My invention relates to improvements in rotary boring drills, but more especially to rotary drill bits having a flat head or more especially of the type called the fish-tail bit. It has for its object a provision of reaming means mounted in the blade of the bit itself whereby the hole being bored is kept at a uniform gage and which rollers also serve to steady the action of the bit.

Another object is to provide a fish tail bit which will not lose clearance and will drill a hole of uniform diameter even when the cutting part of the blade has become worn.

Another object is to construct a fish tail bit simple in structure and with reaming rollers mounted on the side of the blade thereof in such manner that they will be efficiently housed and strongly mounted so as not to become easily injured or broken.

Another object is to provide a means whereby the flushing water may be directed downward in close contact with the material being drilled and to thus more easily flush away the material which would otherwise pack around the blade.

Other objects will more clearly appear in the specification which follows, and will be more particularly pointed out in the claims.

In drilling in earth, clay, gumbo and other soft material the fish tail form of bit has become the most satisfactory form of general utility drill. This is an old type of bit but remains with some drillers the favorite bit for such formation because of its cheap and simple construction, and because it may be successfully spudded; that is, when it becomes balled up it may be raised and dropped again to clear the blade from the accumulations therearound.

When rock, shale or closely packed gumbo and other hard formation is encountered, however, it is liable to become quickly worn and to lose its gage to such an extent as to cause the head to pinch in the hole; furthermore, it is in such formation subject to a violent agitation or vibration in the hole due to its general structure which is not particularly adapted for the hard formation.

Reamers have been tried in connection with this type of bit before, but not, so far as is known, have reaming rollers been mounted in the blade itself. This structure, with the reaming rollers so mounted, has a great advantage over the ordinary fish tail bit, and also over this type used in conjunction with a separate reaming drill collar. By mounting the reaming rollers in the blade itself, it has been found that the vibration in hard formations is greatly lessened. This is, no doubt, due to the fact that the reaming rollers being thus mounted are close to the cutting points of the blade and by bearing against the sides of the hole serve to steady the action of the bit and to cause it to rotate without the excessive vibration hitherto found.

Referring now to the drawings forming a part of this specification:

Figure 1 is a front view of the fish tail bit showing my invention;

Fig. 2 is a lateral or side view thereof; while

Figs. 3 and 4 are broken front views showing modified forms of mounting of the reaming rollers in my invention.

In Figs. 1 and 2 I have shown my invention as mounted in the ordinary type of fish tail bit having a threaded shank, 1, adapted to be screwed into the threaded drill collar not shown and having a lower flat blade, 2. The upper part of the blade, at each side thereof, has been expanded or thickened somewhat at 3 on the two lateral edges to form a housing for a reaming roller 8. This housing extends substantially half way down the blade at the lower end of which is a beveled shoulder 4, extending from the housing to the flat side of the blade. Between the two housings is a depression or groove, 5, to form a passage for the flushing water. The flushing water in this type of drill is supplied through the hollow drill stem which is connected to the upper shank of the bit by means of a drill collar, said flushing water passing through the head of the bit by means of water passages, 6. This flushing water is discharged at the upper end of the passage, 5, and is directed by means of said passage immediately downward upon the bottom of the hole where it serves to flush away the matter disintegrated by the bit.

As will be seen in Fig. 1, the lower or cutting portion of blade 7 is of somewhat wider diameter than the upper portion of the head. This provision is made in order that the hole being dug by the lower cutting portion, 7, shall be of sufficiently large diameter that the upper heavy portion of the head may be advanced without pinching between the sides of the well. When the lower portions of the blade, 7, become worn, however, the gage of the hole is apt to become so much smaller as to scarcely accommodate the upper heavy portion of the head. In order to overcome this disadvantage, I have mounted in the housings, 3, my reaming rollers, 8, in such manner that the outer diameter of the head from one edge of one reaming roller to the outer edge of the other reaming roller, 8, will be of the same dimension as the lower cutting portion 7. In this manner, if the hole is not maintained of uniform diameter by the cutting edge, the reaming rollers will serve to cut away the side of the hole to an extent sufficient to accommodate the upper part of the head, thus maintaining always a uniform diameter of the hole.

In the practice of my invention I have housed the rollers, 8, in a pocket, 9, set in the side of the thickened portion of the bit. These reaming rollers have a longitudinal opening therethrough to accommodate the journal pin, 10, which is inserted in the upper shoulder of the housing at 13, passed through the central bearing opening of the roller, 8, and threaded into a socket in the lower portion of the housing as at 12. Provision is also made to prevent the working loose of the journal pin 10. This provision consists of a laterally extending locking pin, 11, inserted at the side of the housing, 3, in such a manner that it fits within a lateral groove near the head of the pin, 10, in such a manner as to prevent any longitudinal movement of said pin.

In another form of mounting for my reaming rollers shown in Fig. 3, I have illustrated how the reaming rollers can be set on an incline in such a manner that the reaming portion of the roller in contact with the side of the wall is presented in a progressively increasing diameter from the lower portion of the roller to the upper part thereof. This is done by inserting the journal pin, 10, at an incline outwardly from the lower portion of the housing. The opening, 13', is provided at a desired incline and the pin, 10, inserted therethrough carries the roller, 8, inclined outwardly in the manner described.

In Fig. 4 I have made a provision similar to that shown in Fig. 3, but have modified the shape of the roller 8'. This roller is a reversible roller, having its largest diameter midway between the two ends thereof and inclined from this point toward both ends. It will be noted that when this type of roller is mounted on an inclined axis, as shown in Fig. 4, the lower inclined portion, 14', will serve to cut the gage of the hole while the upper inclined portion will present a vertical rolling surface to the side of the hole. This form of roller has been found to be very satisfactory in that the vertical rolling portion thereof serves more readily to steady the action of the bit.

In Fig. 1 I have shown a threaded socket, 16, in the upper part of the shank, 1, in which a lubricator, not shown, may be attached. Oil ducts, 17, lead from the lubricator to each of the bearing pins, 10.

I have thus provided the old form of fish tail bit with reaming rollers mounted on the blade thereof in such manner as to preserve the uniform diameter of the hole and to so steady the action of the bit as to greatly increase its efficiency.

Having thus described my invention, what I claim as new and desire to protect by Letters Patent is:

1. In a fish-tail bit, a shank, a blade thereon, said blade having recesses cut into the outer edge thereof, reaming rollers mounted rotatably within said recesses for the purpose described.

2. In a fish tail bit, a shank, a blade thereon, sockets forming housings in the outer edges of said blade toward the upper half of said blade and reaming rollers in said housings adapted to maintain the uniform size of the hole.

3. In a fish tail bit, a shank, a flat blade thereon, the opposite edges of said blade being widened adjacent one end thereof to form housings, reaming rollers housed therein and adapted to maintain the uniform size of the hole.

4. In a fish tail bit, a shank, a blade thereon, a housing in said blade, a reversible reaming roller mounted therein on an inclined axis, said roller being adapted to steady the action of said bit, and to ream away the side of the hole.

5. In a fish tail bit, a blade, thickened at the edge to provide housings adjacent the upper end thereof, reversible reaming rollers mounted thereon on an inclined axis, said rollers adapted to steady the bit and to maintain the uniform size of the hole.

6. In a fish tail bit, a blade, reaming rollers housed in the opposite edges of said blade, and a depression between said housings to direct the flushing water immediately downward upon the work, said rollers being adapted to steady said blade and maintain the uniform size of the hole.

7. In a rotary bit, a shank, a flat blade thereon, cutters on the lower portion thereof, housings on said blade, cutting rollers mounted in said housings for reaming the side of the hole and a longitudinal depression on the flat surface of the blade to direct the flushing water upon the work.

8. In a fish-tail bit, a shank, a blade thereon, reaming rollers mounted rotatably in the opposite edges of said blade for the purposes set forth.

In testimony whereof, I hereunto affix my signature this the 2nd day of August, A. D. 1917.

HOWARD R. HUGHES.